(12) United States Patent
Alvarez (10) Patent No.: US 9,938,860 B2
(45) Date of Patent: Apr. 10, 2018

(54) HANDLING DEVICE (71) Applicant: SIEMENS AKTIENGESELLSCHAFT, München (DE)

(72) Inventor: Alberto Alvarez, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/113,845

(22) PCT Filed: Jan. 12, 2015

(86) PCT No.: PCT/EP2015/050404
§ 371 (c)(1),
(2) Date: Jul. 25, 2016

(87) PCT Pub. No.: WO2015/121009
PCT Pub. Date: Aug. 20, 2015

(65) Prior Publication Data
US 2017/0030224 A1 Feb. 2, 2017

(30) Foreign Application Priority Data
Feb. 11, 2014 (EP) .................................. 14154585

(51) Int. Cl.
B23P 19/04 (2006.01)
F01D 25/28 (2006.01)
(Continued)

(52) U.S. Cl.
CPC ............ F01D 25/285 (2013.01); F02C 7/264 (2013.01); F23R 3/60 (2013.01); F05D 2220/32 (2013.01);
(Continued)

(58) Field of Classification Search
CPC ................................ B23P 19/00; B23P 19/042
(Continued)

(56) References Cited

U.S. PATENT DOCUMENTS 5,921,075 A * 7/1999 Shimoyama .......... F01D 25/285
431/154
6,141,862 A * 11/2000 Matsui .................. F01D 25/285
29/278
(Continued)

FOREIGN PATENT DOCUMENTS

EP 2070663 A1 6/2009
EP 2952695 A1 * 12/2015 ........... F01D 21/045
(Continued)

OTHER PUBLICATIONS

International Search Report and Written Opinion; PCT/EP2015/050404; International File Date: Jan. 12, 2015; 8 pgs.
(Continued)

Primary Examiner — Lee D Wilson
(74) Attorney, Agent, or Firm — Schmeiser Olsen & Watts LLP (57) ABSTRACT A handling device is provided for handling a burner of a stationary gas turbine during assembly and disassembly, including a base body having at least one contact surface designed to contact a rear end surface of a burner, fixing means for fixing the base body to the rear end surface of the burner, and two arms fixed to and protruding from the base body to different sides of the contact surface, wherein each arm is provided with receiving means, which are designed for removably receiving a fixing component of a lifting appliance and which are spaced apart from each other in the longitudinal direction of a burner during its handling.

11 Claims, 9 Drawing Sheets (51) Int. Cl.
*F23R 3/60* (2006.01)
*F02C 7/264* (2006.01)

(52) U.S. Cl.
CPC ...... *F05D 2230/68* (2013.01); *F05D 2230/70* (2013.01); *F23R 2900/00019* (2013.01)

(58) Field of Classification Search
USPC .......................................................... 29/283
See application file for complete search history.

(56) References Cited

U.S. PATENT DOCUMENTS

| | | | |
|---|---|---|---|
| 8,402,625 B2* | 3/2013 | Holmes | B23B 41/00 |
| | | | 29/281.4 |
| 9,638,106 B2* | 5/2017 | Muller | B25B 27/06 |
| 2012/0159955 A1 | 6/2012 | Shiotani et al. | |
| 2014/0123656 A1* | 5/2014 | Sancewich | F01D 9/026 |
| | | | 60/752 |
| 2014/0208584 A1* | 7/2014 | Foerster | F01D 25/285 |
| | | | 29/700 |
| 2016/0158901 A1* | 6/2016 | Oden | F01D 9/02 |
| | | | 29/889.1 |

FOREIGN PATENT DOCUMENTS

| | | |
|---|---|---|
| GB | 2306155 A | 4/1997 |
| JP | H09168931 A | 6/1997 |

OTHER PUBLICATIONS

Korean Office Action dated Aug. 22, 2017; Korean Patent Application No. 10-2016-7021617.

* cited by examiner

HANDLING DEVICE

CROSS-REFERENCE TO RELATED APPLICATIONS

This application claims priority to PCT Application No. PCT/EP2014/050404, having a filing date of Jan. 12, 2015, based off of EP Application No. 14154585.5 having a filing date of Feb. 11, 2014, the entire contents of which are hereby incorporated by reference.

FIELD OF TECHNOLOGY

The following relates to a handling device for handling a burner of a stationary gas turbine during assembly and disassembly.

BACKGROUND

Stationary gas turbines are known in prior art. They normally comprise a plurality of burners, which are inserted in burner receiving openings of the turbine housing. The receiving openings are arranged at equal intervals along the perimeter of a ring surface, which is inclined with respect to the longitudinal axis of the turbine housing. Accordingly, the burner receiving openings have a plurality of different orientations demanding a high positioning flexibility of a handling device, which is used for handling the heavy burners during their assembly and disassembly.

A burner handling and lifting device realizing such a positioning is described e.g. in EP-A-2 070 663. This device comprises a supporting structure, a movable grappler fixed to the supporting structure and a burner fixture, which is arranged at the free end of the grappler and configured to receive a burner to be handled. The supporting structure, the grappler and the burner fixture provide three translational degrees of freedom and at least two degrees of freedom of the orientation of a burner fixed to the burner fixture. Accordingly, EP-A-2 070 663 proposes a robotic device for handling a burner during its assembly or disassembly. However, the installation of such a robotic device prior to the assembly or disassembly of a burner is very time-consuming and cumbersome. Moreover, robotic devices of the mentioned type are very expensive.

SUMMARY

An aspect relates to a handling device of the above-mentioned type, which has a simple and inexpensive construction and is easy to handle.

A further aspect relates to providing a handling device for handling a burner of a stationary gas turbine during assembly and disassembly, comprising a base body having at least one contact surface designed to contact a rear end surface of a burner, fixing means for fixing the base body to said rear end surface of the burner, two arms fixed to and protruding from said base body to different sides of the contact surface, wherein each arm is provided with receiving means, which are designed for removably receiving a fixing component of a lifting appliance, such as a hook or a belt of a crane or the like, and which are spaced apart from each other in the longitudinal direction of a burner during its handling. In other words, embodiments of the present invention provides some kind of a lifting bracket, which on the one hand can be fixed to a burner and on the other hand can be picked up by a lifting appliance. Thanks to its little weight and small dimensions, the handling device according to embodiments of the present invention is easy to transport and to handle. Moreover, the manufacture of the handling device is inexpensive. Thanks to the fact, that the receiving means provided at the arms are spaced apart from each other in the longitudinal direction of a burner during its handling, a burner can be held in many different orientations, whereby the needed positioning flexibility is realized.

According to one embodiment of the handling device of the present invention the fixing means comprise at least one screw. The usage of screws enables an easy and inexpensive fixation of the handling device to a burner to be handled.

Preferably, the base body comprises at least one slot hole for receiving the at least one screw, said slot hole preferably extending along a predetermined circular arc corresponding to a screw-hole circle arranged at the rear end surface of a burner. The at least one slot hole allows an easy handling of the handling device while fastening the contact surface to the rear end surface of the burner.

According to one embodiment of the present invention the slot hole is arranged adjacent to the contact surface.

Preferably, the base body is provided with additional protruding fixing pins, which are inserted in corresponding holes provided at the rear end surface of the burner. Such fixing pins stabilize the connection between the handling device and the burner to be handled. Moreover, the fixing pins may be used to adjust the handling device with respect to the burner before its base body is fastened thereto.

According to one embodiment of the present invention, the contact surface draws an angle of 80° to 90° with each arm in at least one operating position of the arms. Accordingly, the receiving means can be positioned far away from each other in this operating position. Advantageously, the arms are rotatably fixed to the base body and are lockable in different rotating positions, in particular, by means of quick release pins. Thus, the rotating position of the arms can be adapted to different situations of use.

Preferably, the arms are rotatable at least from 0° to 90° with respect to the contact surface. Accordingly, the arms of the handling device can be folded in order to simplify the transport of the handling device.

According to one embodiment of the present invention, the position of one receiving means is chosen in such a manner, that it is or can be situated radially above the balance point of the burner during its handling. This simplifies the handling of the burner in a horizontal orientation.

The receiving means are advantageously provided close to the free end of each arm.

Preferably, the receiving means are provided as shackles.

BRIEF DESCRIPTION

Some of the embodiments will be described in detail, with reference to the following figures, wherein like designations denote like members, wherein.

DETAILED DESCRIPTION

Figure 1:
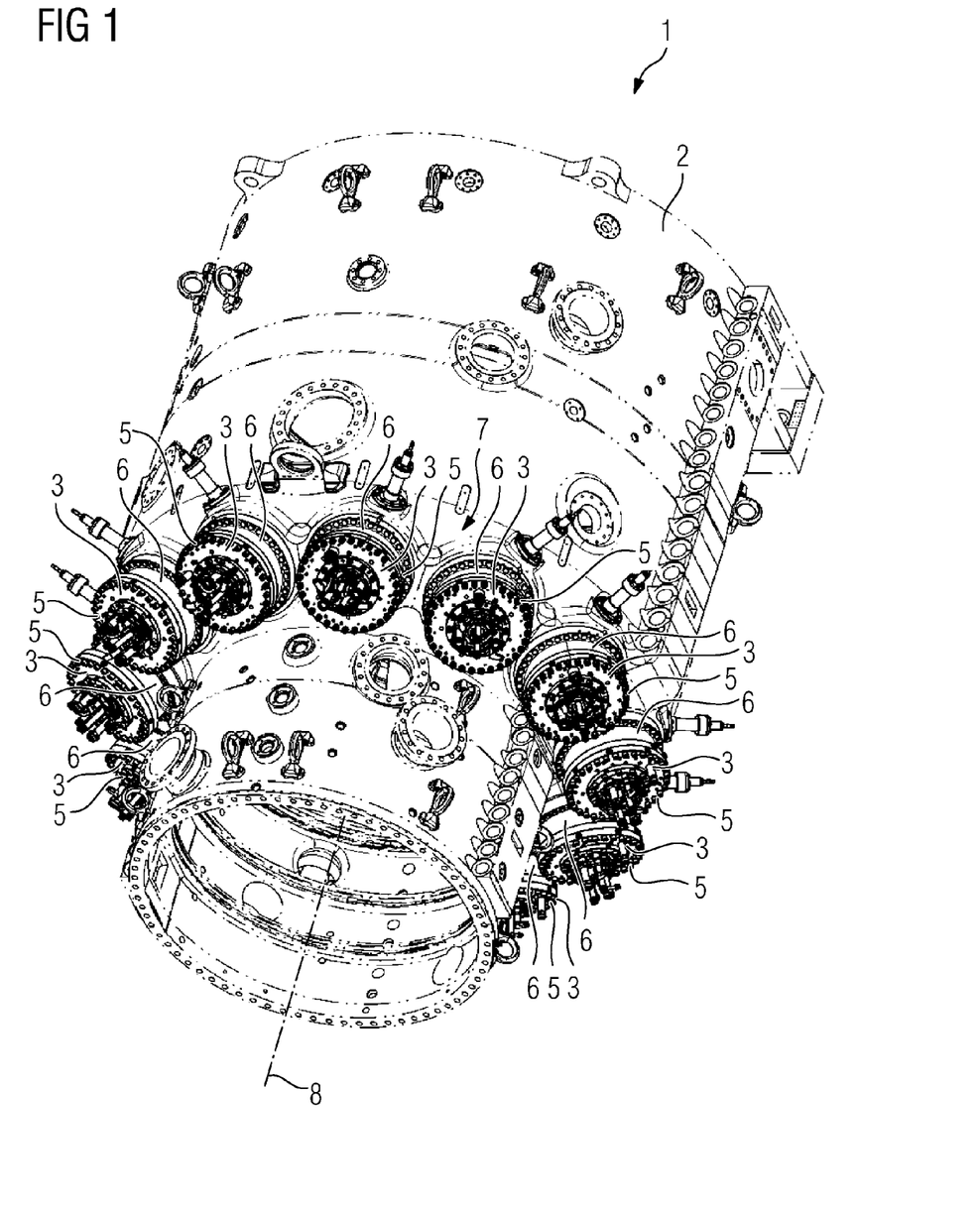
FIG. 1 is a partial perspective view of an embodiment of a stationary gas turbine comprising several burners.
Figure 2:
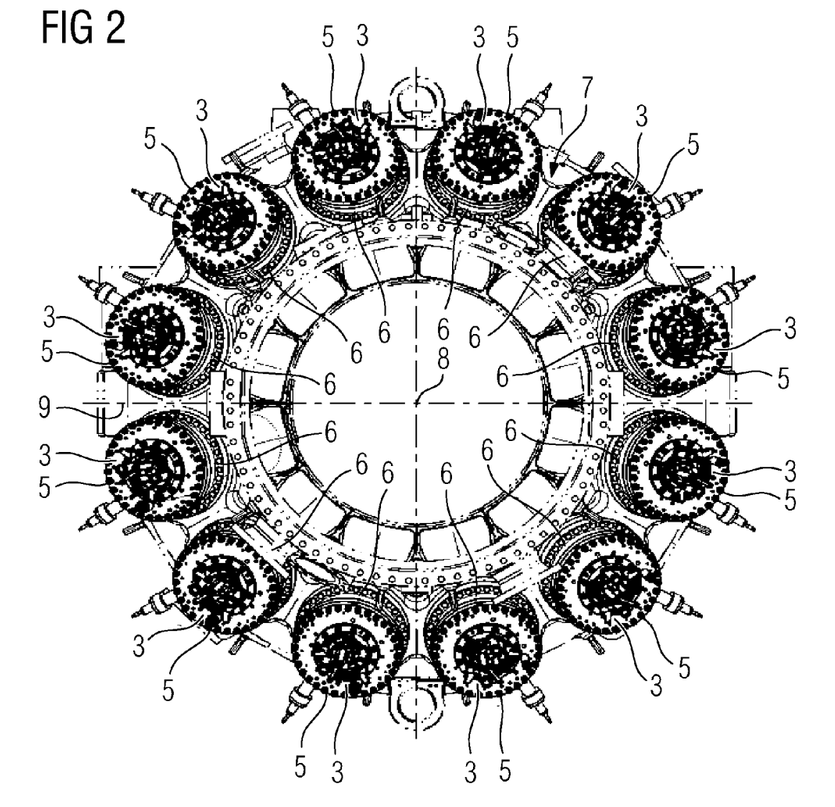
FIG. 2 is a rear view of an embodiment of the gas turbine shown in FIG. 1.
Figure 3:
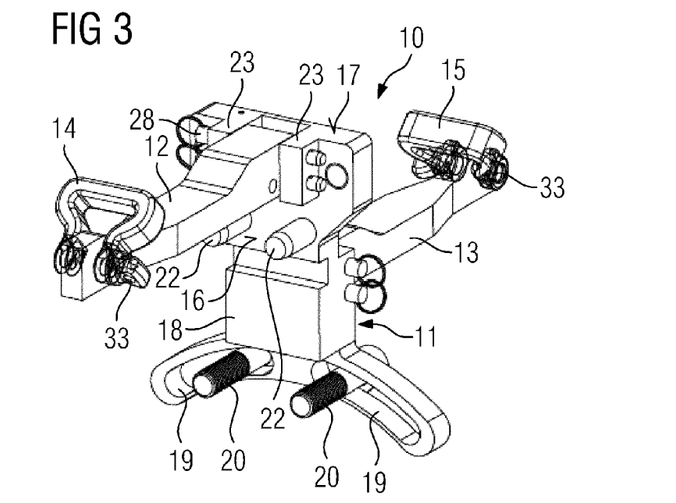
FIG. 3 is a perspective front view of a handling device according to an embodiment of the present invention.
Figure 4:
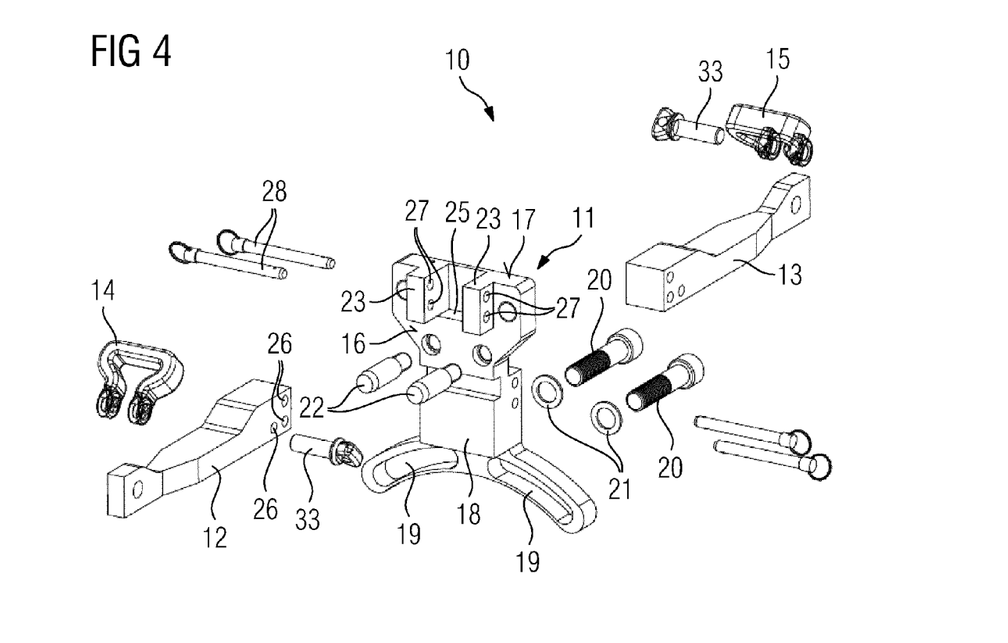
FIG. 4 is an exploded front view of an embodiment of the handling device shown in FIG. 3.
Figure 5:
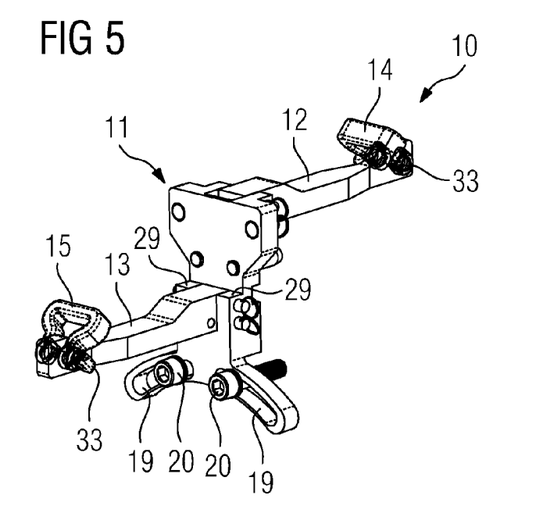
FIG. 5 is a perspective rear view of an embodiment of the handling device shown in FIGS. 3 and 4.
Figure 6:
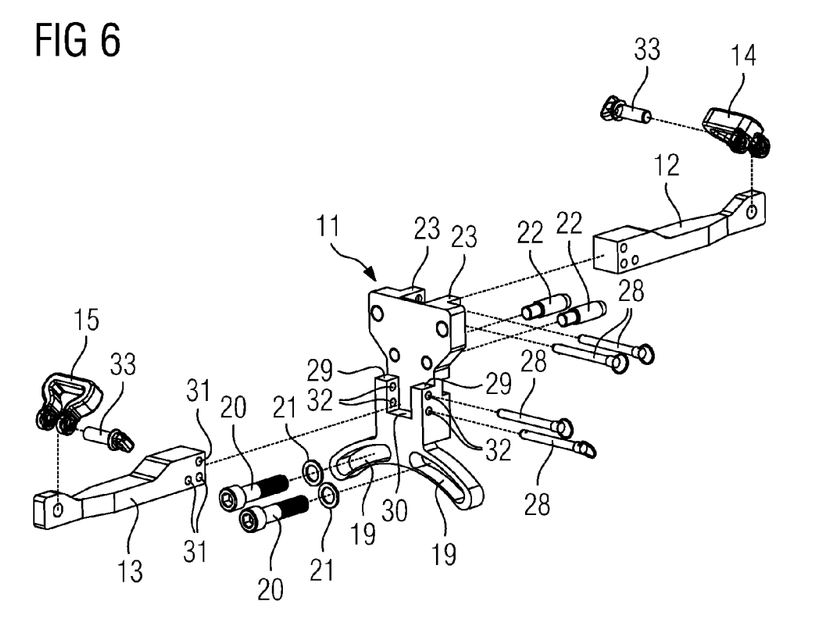
FIG. 6 is an exploded rear view of an embodiment of the handling device shown in FIGS. 3 to 5.

FIGS. 1 and 2 shows a part of an exemplary stationary gas turbine 1, which is known in prior art. The stationary gas turbine 1 comprises a turbine housing 2 and twelve burners 3, which are inserted in allocated burner receiving openings 4 of the turbine housing 2 at positions P1 to P12 and are screwed at flange portions 5 provided at the rear end of each burner 3 with essentially cylindrical shells 6 attached to the turbine housing 2. The burner receiving openings 4 are arranged at equal intervals along the perimeter of a ring surface 7 of the turbine housing 2, which is inclined with respect to a longitudinal axis 8 of the turbine housing 2. Accordingly, the burner receiving openings 4 and the burners 3 inserted therein have a plurality of different orientations. For example, the respective inclination angles with respect to a horizontal plane 9 of the burners 3 at the positions P1 and P12 are different to the respective inclination angles of the burners 3 at the positions P2 and P11, which again differ from the respective inclination angles of the burners 3 at the positions P3 and P10. This plurality of different orientations of the burners 3 demands a high positioning flexibility of a handling device, which is used for handling the heavy burners 3 during their assembly and disassembly.

FIGS. 3 to 6 show a handling device 10 according to an embodiment of the present invention, which can be used for handling the burners 3 of the stationary gas turbine 1 during their assembly and disassembly. The handling device 10 comprises as main components a base body 11 and two arms 12 and 13 fixed to and protruding from the base body 11 in opposite directions, wherein each arm 12, 13 is provided with a receiving means 14, 15 being designed for removably receiving a fixing component of a lifting appliance as it is described later.

The base body 11 comprises a front side 16 and a rear side 17. In the middle portion of the front side 16, the base body 11 defines a contact surface 18 designed to contact a rear end surface of the burners 3. The lower portion of the base body 11 has the form of a shackle comprising two slot holes 19 being dimensioned to receive screws 20, which are provided with appropriate washers 21. The slot holes 19 extend along a predetermined circular arc corresponding to a screw-hole circle arranged at the rear end surface of each burner 3. Above the contact surface 18 the front side 16 of the base body 11 is provided with protruding fixing pins 22, which are arranged and dimensioned for being received in corresponding receiving bores 23 provided at the rear end surface of each burner 3. The upper portion of the front side 16 of base body 11 is provided with two arm receiving projections 23, which are spaced apart from each other for receiving the first arm 12, and which define a bearing face 25 for the first arm 12 in between. At the free end of the first arm 12 facing to the base body 11 are provided three through holes 26, which are arranged in L-shape and can be brought in coverage with two through holes 27, which are provided about each other in each of the arm receiving projections 24, respectively, in order to fix the first arm 12 to the arm receiving projections 24 by means of quick release pins 28. Thanks to the L-shaped arrangement of the through holes 26, the first arm 12 can be connected to the arm receiving projections 24 in two positions. In the first position, the first arm 12 backwardly projects from the base body 11 essentially at right angle. In the second position, the first arm 12 projects upwardly from the base body 11. The second arm 13 is fixed to the front side 16 of base body in a corresponding fashion by means of arm receiving projections 29. The arm receiving projections 29 are spaced apart from each other for receiving the second arm 13 and define a bearing face 30 for the second arm 13 in between. At the free end of the second arm 13 facing to the base body 11 are provided three through holes 31, which are arranged in L-shape and can be brought in coverage with two through holes 32, which are provided about each other in each of the arm receiving projections 29, respectively, in order to fix the second arm 13 to the arm receiving projections 29 by means of quick release pins 28. Thanks to the L-shaped arrangement of the through holes 31, the second arm 13 can be connected to the arm receiving projections 29 in two positions. In the first position, the second arm 13 forwardly projects from the base body 11 essentially at right angle. In the second position, the second arm 13 projects upwardly from the base body 11. Accordingly, when both arms 12 and 13 are arranged in their first position, they protruding from the base body 11 to different sides of the contact surface 18. The arms 12 and 13 comprise at their outer free ends the receiving means 14, 15, which are provided as shackles. The receiving means 14, 15 are fixed to the arms 12 and 13 by means of quick release bolts 33, which are inserted in corresponding through bores 25 provided in the arms 12 and 13.

Figure 7:
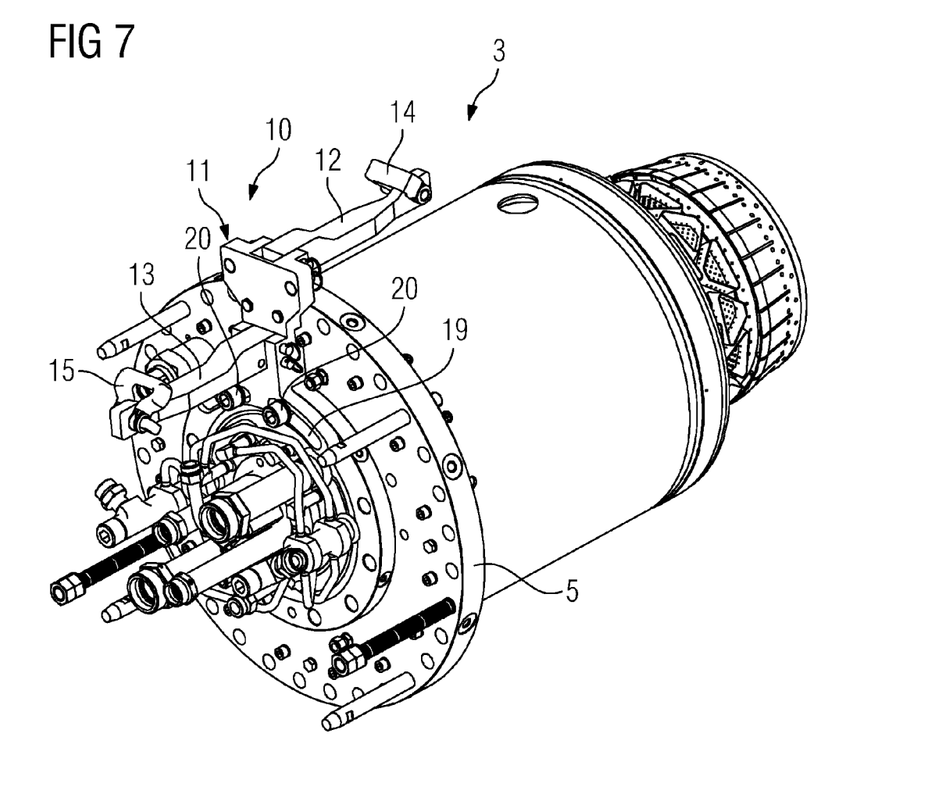
FIG. 7 is a perspective rear view of an embodiment of a burner of the stationary gas turbine shown in FIGS. 1 and 2, to which the handling device according to FIGS. 3 to 6 is fixed.

In order to fix the handling device 10 to a burner 3, as shown in FIG. 7, the fixing pins 22 provided at the front side 16 of the base body 11 are firstly inserted in the corresponding receiving bores 23 arranged at the rear end surface of the burner 3. Subsequently, the screws 20 are inserted in the slot holes 19 and are screwed into corresponding screw holes of the screw-hole-circle arranged at the rear end surface of the burner 3. After the tightening of the screws 20 the handling device 10 is fastened to the burner 3.

FIGS. 8 to 11 show different orientations of a burner 3 held by belts 34 and 35, which can be realized by changing the length of the belts 34 and 35, such that the belts 34 and 35 draw different angles α, as it is described in the following.

Figure 8:
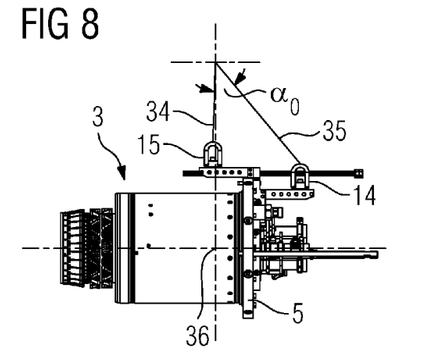
FIG. 8 is a side view of an embodiment of the arrangement shown in FIG. 7, wherein the burner is held in a horizontal orientation by means of a fixing component of a lifting appliance.

Thanks to the fact that the position of the receiving means 15 of the second arm 13 is chosen in such a manner, that it is situated radially above the balance point 36 of the burner 3, the burner 3 can be orientated in a horizontal position as shown in FIG. 8, when the belts 34 and 35 define an angle $\alpha_0$.

Figure 9:
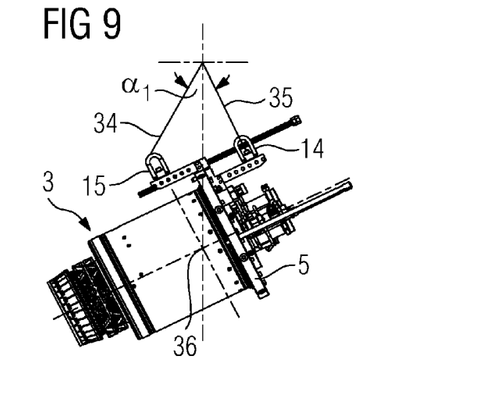
FIG. 9 is a side view of an embodiment of the arrangement shown in FIG. 7, wherein the burner is held in a first inclined position by means of fixing component of a lifting appliance.

A first inclined position of the burner 3, which is shown in FIG. 9, can be realized, when belts 34 and 35 define an angle $\alpha_1$. This first inclined position corresponds to the orientation of the burner 3 at positions P1 and P12 in FIG. 2.

Figure 10:
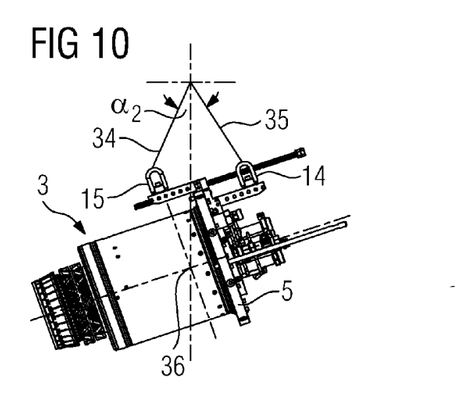
FIG. 10 is a side view of an embodiment of the arrangement shown in FIG. 7, wherein the burner is held in a second inclined position by means of fixing component of a lifting appliance.

A second inclined position shown in FIG. 10, which corresponds to the orientation of the burners 3 at positions P2 and P11 in FIG. 2, can be realized, when the belts 34 and 35 form an angle $\alpha_2$.

Figure 11:
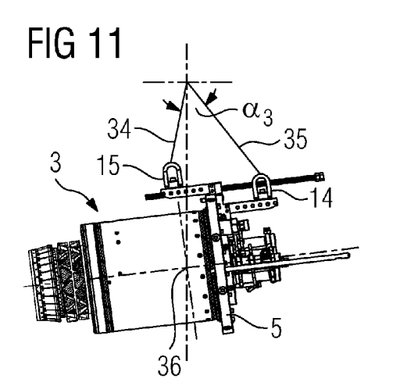
FIG. 11 is a side view of an embodiment of the arrangement shown in FIG. 7, wherein the burner is held in a third inclined position by means of fixing component of a lifting appliance.

A third inclined position shown in FIG. 11, which corresponds to the orientation of the burners 3 in positions P3 and P10, can be realized, when the belts 34 and 35 form an angle $\alpha_3$.

Figure 12:
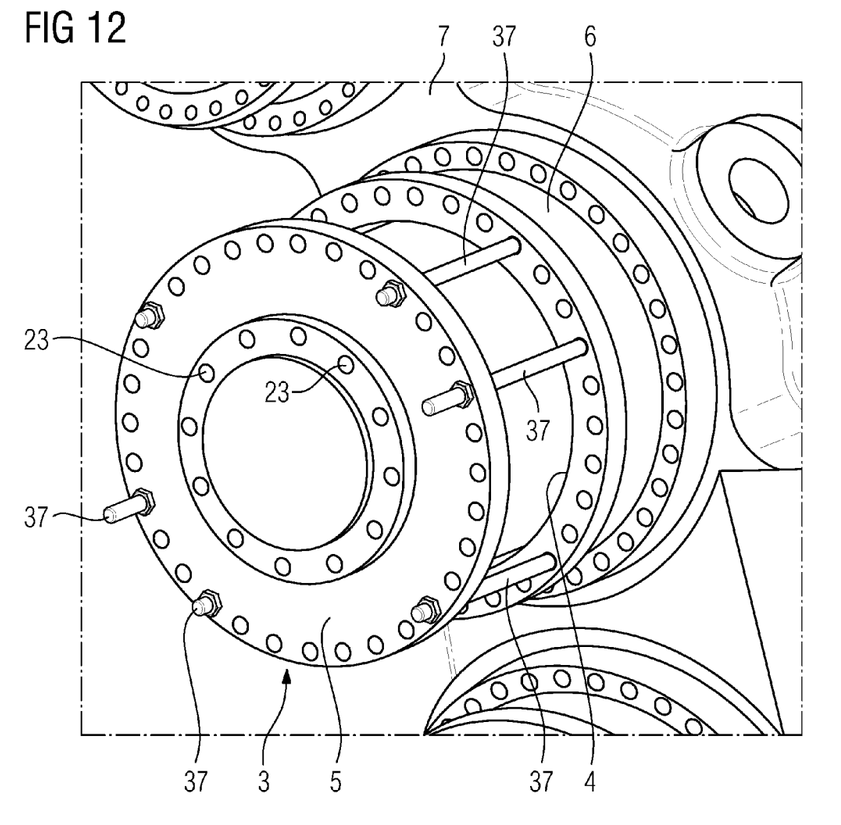
FIG. 12 is a perspective partial view of an embodiment of the arrangement shown in FIGS. 1 and 2 showing a burner, which is jacked out by a predetermined amount from its allocated burner receiving opening.
Figure 13:
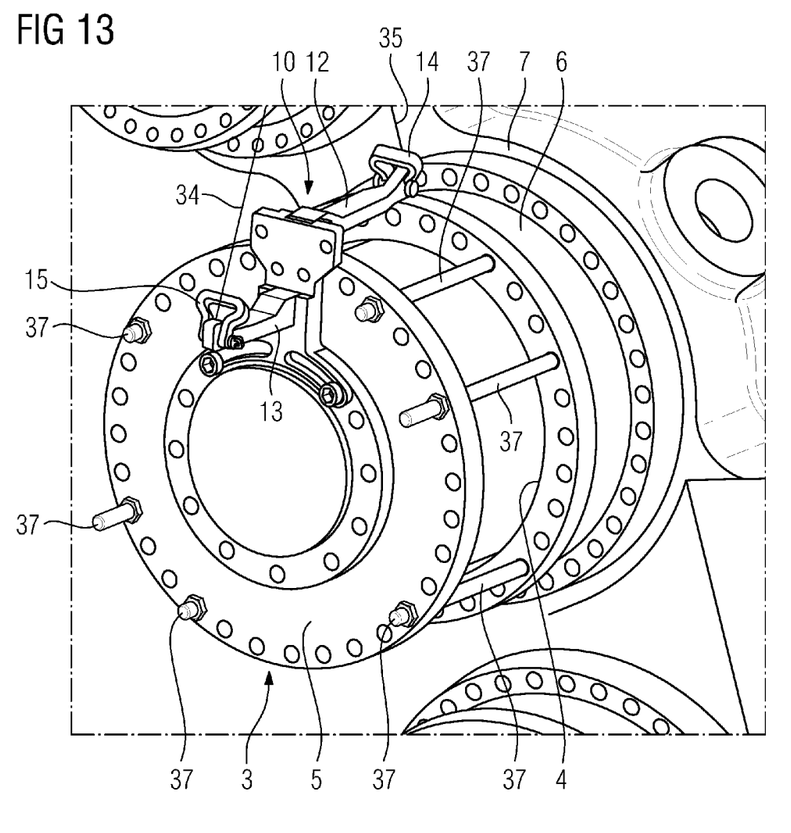
FIG. 13 corresponds to FIG. 12, wherein an embodiment of the handling device shown in FIGS. 3 to 5 is fixed to the burner.
Figure 14:
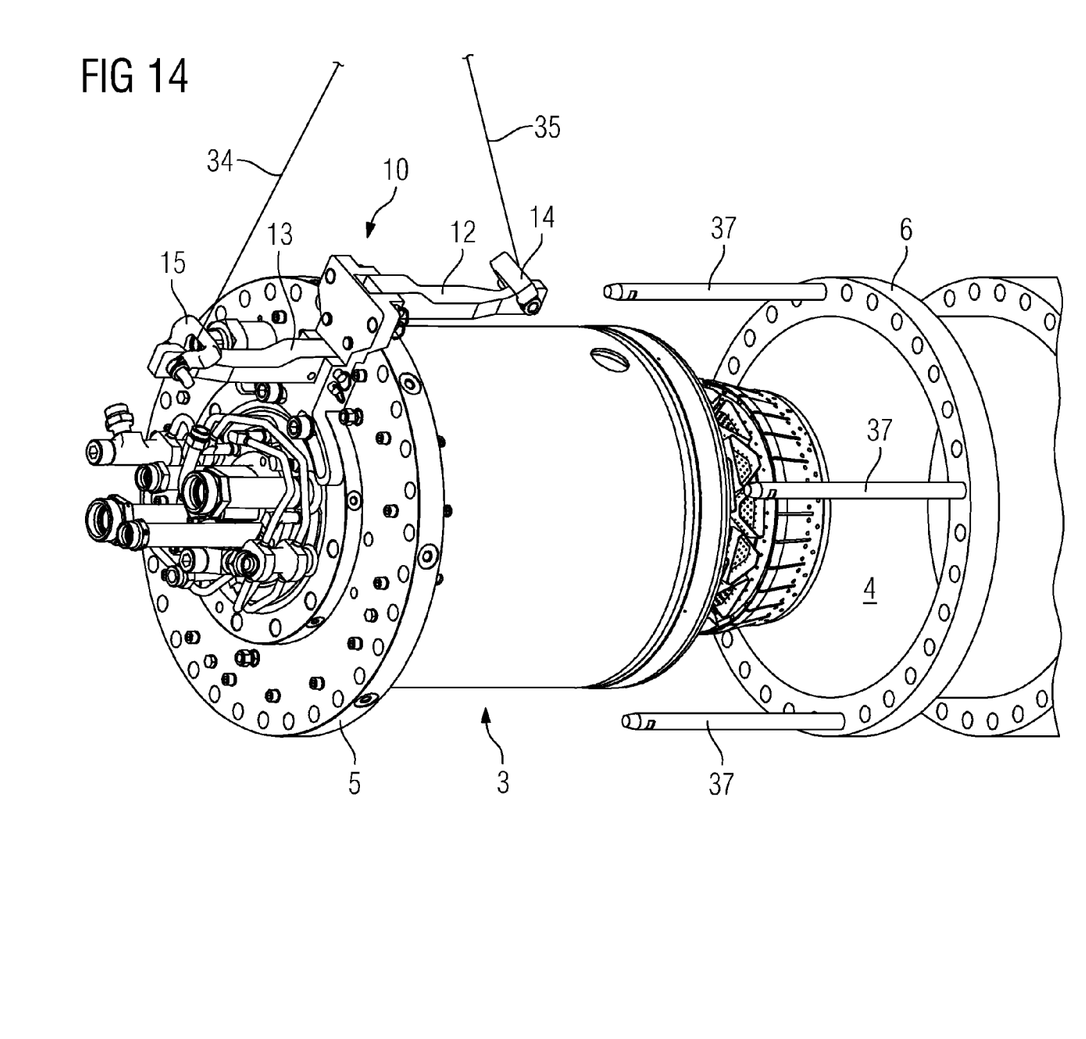
FIG. 14 is a perspective partial view of an embodiment of the arrangement shown in FIG. 13, wherein the burner is completely jacked out from its allocated burner receiving opening by means of a fixing component of a lifting appliance coupled to the handling device.

FIGS. 12 to 14 show the removal of the burner 3 being arranged at position P3 of FIG. 2.

In a first step, as shown in FIG. 12, the burner 3 is jacked out from the allocated burner receiving opening 4 by a predetermined distance using a known jacking hardware and a plurality of threaded rods 37, which presently will not be described in detail.

In a second step, which is shown in FIG. 13, the handling device 10 is attached to the rear end surface of the burner 3 as it was described with reference to FIG. 7 before. Moreover, belts 33 and 35 are fastened to the receiving means 14 and 15 of the handling device 10, wherein the length of the belts 34 and 35 is chosen in such a manner that the third inclined position according to FIG. 11 is realized.

Subsequently, as shown in FIG. 14, the burner 3 is removed from the turbine housing 2 by means of lifting appliance, such as a crane.

Thanks to its little weight, small dimensions, and the possibility of folding it the handling device 10 is easy to transport and to handle. Moreover, the manufacture of the handling device 10 is inexpensive. Due to the fact, that the receiving means 14, 15 provided at the arms 12, 13 are spaced apart from each other in the longitudinal direction of a burner 3 during its handling, a burner 3 can be held in many different orientations, whereby the needed positioning flexibility is realized.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A handling device for handling a burner of a stationary gas turbine during assembly and disassembly, comprising:
   a base body having at least one contact surface designed to contact a rear end surface of a burner;
   a fixing means for fixing the base body to the rear end surface of the burner; and
   two arms fixed to and protruding from the base body to different sides of the at least one contact surface;
   wherein each arm of the two arms is provided with a receiving means, designed for removably receiving a fixing component of a lifting appliance and which are spaced apart from each other in a longitudinal direction of the burner during handling;
   wherein the two arms are rotatably fixed to the base body and are lockable in different rotating positions with respect to the at least one contact surface.

2. The handling device according to claim 1, wherein the fixing means comprises at least one screw.

3. The handling device according to claim 2, wherein the base body comprises at least one slot hole for receiving the at least one screw, the at least one slot hole extending along a predetermined circular arc corresponding to a screw-hole circle arranged at the rear end surface of the burner.

4. The handling device according to claim 3, wherein the at least one slot hole is arranged adjacent to the at least one contact surface.

5. The handling device according to claim 1, wherein the base body is provided with a plurality of additional protruding fixing pins.

6. The handling device according to claim 1, wherein the at least one contact surface draws an angle of 80° to 90° with each arm of the two arms in at least one operating position of the two arms.

7. The handling device according to claim 1, wherein the two arms are rotatably fixed to the base body by means of a plurality of quick release pins.

8. The handling device according to claim 7, wherein the two arms are rotatable at least from 0° to 90° with respect to the at least one contact surface.

9. The handling device according to claim 1, wherein a position of one of the receiving means is chosen in such a manner, that the receiving means is situated radially above a balance point of the burner during handling.

10. The handling device according to claim 1, wherein the receiving means are provided close to a free end of each arm of the two arms.

11. The handling device according to claim 1, wherein the receiving means are provided as shackles.

* * * * *